United States Patent
Hwang et al.

(10) Patent No.: US 8,238,471 B2
(45) Date of Patent: Aug. 7, 2012

(54) APPARATUS AND METHOD FOR INTERFERENCE CANCELLATION IN MULTI-ANTENNA SYSTEM

(75) Inventors: In-Soo Hwang, Yongin-si (KR); Yung-Soo Kim, Seongnam-si (KR); Myeon-Kyun Cho, Seongnam-si (KR); Eun-Seok Ko, Suwon-si (KR); Vahid Tarokh, Cambridge, MA (US)

(73) Assignee: Samsung Electronics Co., Ltd. (KR)

( * ) Notice: Subject to any disclaimer, the term of this patent is extended or adjusted under 35 U.S.C. 154(b) by 1034 days.

(21) Appl. No.: 12/165,884

(22) Filed: Jul. 1, 2008

(65) Prior Publication Data
US 2009/0010359 A1    Jan. 8, 2009

(30) Foreign Application Priority Data
Jul. 5, 2007    (KR) .................... 10-2007-0067479

(51) Int. Cl.
*H04L 25/49* (2006.01)
(52) U.S. Cl. ..................... 375/296; 375/295
(58) Field of Classification Search ............... 375/296, 375/297; 455/63.1, 67.13, 69, 114.2, 114.3, 455/134, 135
See application file for complete search history.

(56) References Cited

U.S. PATENT DOCUMENTS

| | | | | |
|---|---|---|---|---|
| 6,067,449 A | * | 5/2000 | Jager | 455/277.2 |
| 7,340,257 B2 | * | 3/2008 | Heddergott et al. | 455/450 |
| 2008/0273618 A1 | * | 11/2008 | Forenza et al. | 375/261 |

FOREIGN PATENT DOCUMENTS

| | | |
|---|---|---|
| KR | 1020060049146 | 5/2006 |
| KR | 1020060096360 | 9/2006 |
| WO | WO 2007/027825 | 3/2007 |
| WO | WO 2007/051192 | 5/2007 |

* cited by examiner

*Primary Examiner* — Sam K Ahn
*Assistant Examiner* — Janice Tieu
(74) *Attorney, Agent, or Firm* — The Farrell Law Firm, P.C.

(57) ABSTRACT

An apparatus and a method for interference cancellation in a transmitting end of a multi-antenna system are provided. A precode is generated which maximizes a diversity gain of one or more receive antennas using channel information of the receive antennas to be serviced. Transmit powers of the receive antennas are updated by taking into account a power loss and a shaping loss according to a dirty paper coding. Transmit signals are precoded by updating the precode according to the updated transmit powers. The dirty paper coding is performed on the precoded transmit signals to be transmitted to the receive antennas.

16 Claims, 7 Drawing Sheets

APPARATUS AND METHOD FOR INTERFERENCE CANCELLATION IN MULTI-ANTENNA SYSTEM

PRIORITY

This application claims priority under 35 U.S.C. §119(a) to a Korean patent application filed in the Korean Intellectual Property Office on Jul. 5, 2007 and assigned Serial No. 2007-67479, the entire disclosure of which is incorporated herein by reference.

BACKGROUND OF THE INVENTION

1. Field of the Invention

The present invention relates generally to an apparatus and a method for interference cancellation in a wireless communication system, and more particularly, to an apparatus and a method for controlling a power to satisfy Quality of Service (QoS) per user in interference cancellation in a multi-antenna system.

2. Description of the Related Art

Rapid growth of a wireless mobile communication market requires various multimedia services in a wireless environment. To provide the multimedia services, research is being conducted on a multi-antenna system (e.g., Multiple-Input Multiple-Output (MIMO) system) for efficiently utilizing the limited frequency in accordance with the mass transmit data and the high data rate.

The multi-antenna system transmits data using an independent channel per antenna, and thus enhances the transmission reliability and the data rate without an additional frequency or transmit power allocation, compared to a single-antenna system. Also, the multi-antenna system can raise the spectral efficiency such that multiple users simultaneously share the spatial resources acquired through the multiple antennas.

The multi-antenna system in the multi-user environment suffers interference between the users or between the antennas. To mitigate the interference, the multi-antenna system adopts a linear scheme such as a Zero Forcing (ZF) beamforming scheme or a Minimum Mean Square Error (MMSE) scheme.

When the multi-antenna system cancels interference using the linear scheme, the implementation of the multi-antenna system is easy to facilitate, and the error rate does not greatly increase even when available channel information is less than the entire channel information. However, in using the linear scheme, the multi-antenna system cannot acquire the maximum channel capacity by means of the multiple antennas.

Hence, the MIMO system of the multi-user environment cancels the interference between the users or the antennas using a Dirty Paper Coding (DPC), which is a nonlinear precoding scheme. Using the DPC in the multi-antenna system of the multi-user environment, the transmitting end sends a transmit signal by subtracting an integer of the amount considering the interference from the transmit signal through the modulo operation. The receiving end can infer the information through the same modulo operation as in the transmitting end. For example, the multi-antenna system can cancel the interference using either Tomlinson-Harashima Precoding (THP) which applies the DPC in one dimension, or Vector Perturbation (VP) which applies the DPC in N dimensional vectors through the modulo operation.

As discussed above, the multi-antenna system of the multi-user environment can alleviate the interference between the users or the antennas using the linear or nonlinear scheme. However, the linear scheme is likely to degrade the performance of the multi-antenna system and to waste the transmit power unless the channels selected for the signal transmission between the users are orthogonal. The nonlinear scheme demands the constant transmission rate per user in the multi-antenna system and does not guarantee Quality of Service (QoS) per user because of the DPC.

SUMMARY OF THE INVENTION

The present invention has been made to address at least the above-mentioned problems and/or disadvantages and to provide at least the advantages described below. Accordingly, an aspect of the present invention provides an apparatus and a method for interference cancellation per user or per antenna using a precoding and a dirty paper coding to acquire a maximum diversity gain in a transmitting end of a multi-antenna system.

Another aspect of the present invention provides an apparatus and a method for controlling a transmit power per user to satisfy Quality of Service (QoS) per user in interference cancellation at a transmitting end of a multi-antenna system.

A further aspect of the present invention provides an apparatus and a method for controlling a transmit power per user to satisfy QoS per receive antenna in interference cancellation at a transmitting end of a multi-antenna system.

An additional aspect of the present invention provides an apparatus and a method for lowering error propagation in interference cancellation using a dirty paper coding at a transmitting end of a multi-antenna system.

According to an aspect of the present invention a method is provided for canceling interference in a transmitting end of a multi-antenna system. A precode is generated which maximizes a diversity gain of one or more receive antennas using channel information of the receive antennas to be serviced. Transmit powers of the receive antennas are updated by taking into account a power loss and a shaping loss according to a dirty paper coding. Transmit signals are precoded by updating the precode according to the updated transmit powers. The dirty paper coding is performed on the precoded transmit signals to be transmitted to the receive antennas. According to another aspect of the present invention, a transmitting end apparatus in a multi-antenna system is provided. The apparatus includes a controller for controlling transmit powers of one or more receive antennas using channel information of the receive antennas to be serviced, and generating a precode which maximizes a diversity gain of the receive antennas using the transmit powers. The apparatus also includes a transmitter for precoding transmit signals using the precode, performing a dirty paper coding on the precoded transmit signals, and transmitting the transmit signals via transmit antennas.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF PREFERRED EMBODIMENTS

Figure 1:
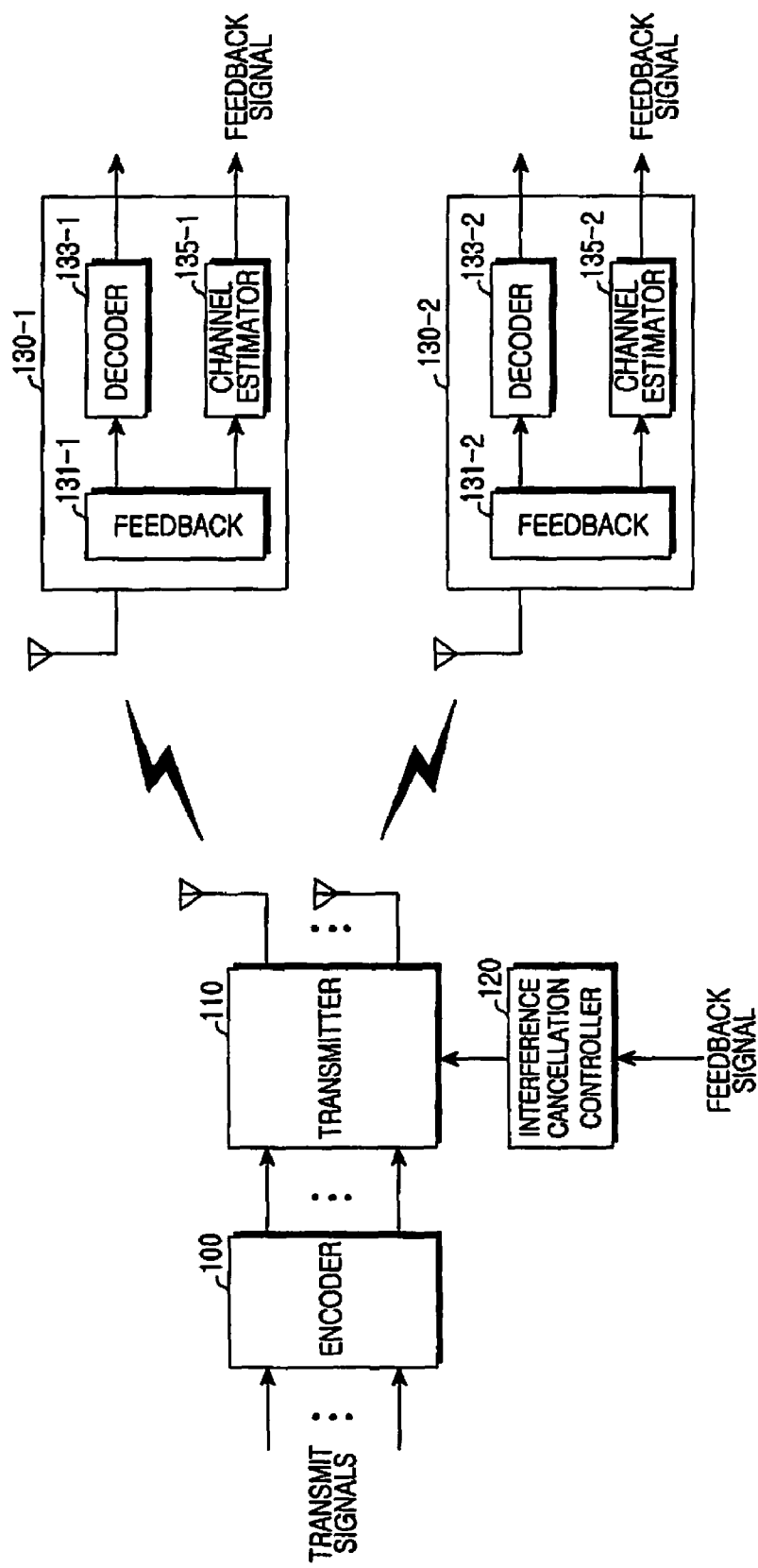
FIG. 1 is a diagram illustrating a structure of a multi-antenna system according to an embodiment of the present invention.

Preferred embodiments of the present invention are described in detail below with reference to the accompanying drawings Similar components are designated by similar reference numerals although they are illustrated in different drawings. Detailed descriptions of constructions or processes known in the art may be omitted to avoid obscuring the subject matter of the present invention.

The present invention provides a technique for canceling interference between users or between receive antennas in a multi-antenna system. Particularly, the present invention provides a technique for controlling a transmit power to satisfy Quality of Service (QoS) per user and for reducing error propagation according to a Zero-Forcing (ZF) based dirty paper coding in the process of the interference cancellation in the multi-antenna system.

While the multi-antenna system employs a 2×2 system by way of example, the present invention is applicable to any M×N system. While the 2×2 system is assumed to include a transmitting end having two antennas and two receiving ends having one antenna as shown in FIG. 1, the present invention is also applicable to a transmitting end having two antennas and a receiving end having two antennas.

The multi-antenna system can control the transmit power to meet the QoS per receive antenna of one receiving end in the same manner as in meeting the QoS per user. Hence, it is assumed that the transmit power is controlled to meet the QoS per receive antenna. Herein, the receiving end is a means for each user to receive a signal from the transmitting end. In the following explanations, the receiving end substantially represents the user.

FIG. 1 is a diagram illustrating a structure of a multi-antenna system according to an embodiment of the present invention.

The multi-antenna system of FIG. 1 includes a transmitting end having two antennas and two receiving ends, each having one antenna.

The transmitting end includes an encoder 100, a transmitter 110, an interference cancellation controller 120, and antennas. The transmitting end further includes a scheduler (not shown) for selecting the receiving end to be serviced among the receiving ends in a service coverage.

The encoder 100 encodes and modulates a transmit signal to be sent to the receiving end, which is selected by the scheduler, at a preset modulation (e.g., Modulation and Coding Scheme (MCS)) level.

The transmitter 110 precodes and applies the dirty paper coding on the signals output from the encoder 100 to cancel the interference between the receiving ends, or the receive antennas, under the control of the interference cancellation controller 120, and then outputs the signals via the transmit antennas.

In more detail, the transmitter 110 precodes the signals output from the encoder 100 using a precoding matrix provided from the interference cancellation controller 120. Next, the transmitter 110 performs the dirty paper coding by arranging the precoded signals under the control of the interference cancellation controller 120.

The interference cancellation controller 120 generates the precoding matrix which maximizes a diversity gain of the receive antennas based on channel information received from the receiving ends in the service coverage, and provides the generated precoding matrix to the transmitter 110.

The interference cancellation controller 120 controls the power to satisfy the QoS per receive antenna to be serviced. Using the power controlled to meet the QoS per receive antenna, the interference cancellation controller 120 can generate the precoding matrix or update the generated precoding matrix.

To reduce the error propagation according to the dirty paper coding, the interference cancellation controller 120 controls the transmitter 110 to arrange the signals to be sent to the receiving ends and to perform the dirty paper coding on the arranged signals. In doing so, the interference cancellation controller 120 controls the transmitter 110 to arrange the signals to be sent to the receiving ends to maximize a Signal to Interference and Noise Ratio (SINR) or a sum capacity.

The receiving ends 130-1 and 130-2 include receivers 131-1 and 131-2, decoders 133-1 and 133-2, and channel estimators 135-1 and 135-2. Herein, the receiving ends 130-1 and 130-2 are constructed in the substantially same structure.

The receivers 131-1 and 131-2 forward the signal received on the receive antenna to the decoders 133-1 and 133-2 and the channel estimators 135-1 and 135-2. The receivers 131-1 and 131-2 decode the signal, which passed through the dirty paper coding and the preceding in the transmitter 110 of the transmitting end.

The decoders 133-1 and 133-2 detect the transmit signal by demodulating and decoding the signal provided from the receivers 131-1 and 131-2 at a preset modulation level (e.g., the MCS level).

The channel estimators 135-1 and 135-2 estimate a downlink channel using the signal fed from the receivers 131-1 and 131-2. Next, the channel estimators 135-1 and 135-2 feed the downlink channel information back to the transmitting end.

Figure 2:
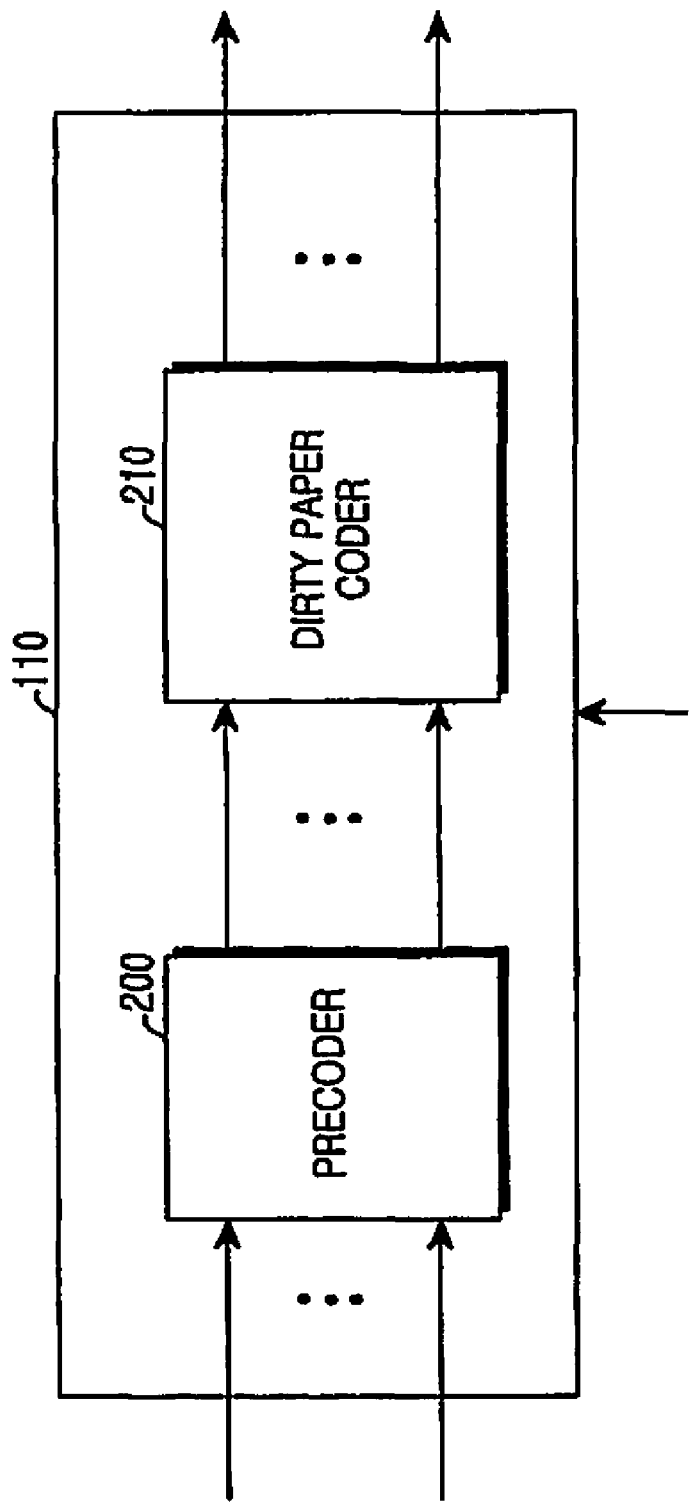
FIG. 2 is a diagram illustrating a transmitter of a transmitting end in the multi-antenna system according to an embodiment of the present invention.

FIG. 2 is a block diagram illustrating the transmitter 110 of the transmitting end in the multi-antenna system according to an embodiment of the present invention.

The transmitter 110 of FIG. 2 includes a precoder 200 and a dirty paper coder 210.

The precoder 200 precodes the signal output from the encoder 100 using the precoding matrix, which is generated and provided from the interference cancellation controller 120, to acquire the maximum diversity gain per receive antenna.

The dirty paper coder 210 conducts the dirty paper coding by arranging rows of the precoded matrix provided from the precoder 200 under the control of the interference cancellation controller 120. More specifically, the dirty paper coder 210 executes the dirty paper coding by arranging rows of the precoded matrix so as to maximize the SINR or the sum capacity of the receive antennas under the control of the interference cancellation controller 120. As the dirty paper coder 210 arranges the rows of the precoded matrix, the order of the receive antennas is changed. Accordingly, in the dirty paper coding, the dirty paper coder 210 arranges the receive antennas based on the SINR or the sum capacity.

For example, the dirty paper coder 210 codes the transmit signal in proportion to an interference signal to mitigate the interference between the users or between the receive antennas. The signal received at the receiving end from the transmitting end is expressed as Equation (1).

$$r = Hx + n = HAc + n = Bc + n \quad (1)$$

In Equation (1), r denotes the signal received from the transmitting end, H denotes a channel between the transmitting end and the receiving antenna, and x denotes the signal transmitted from the transmitting end after the precoding and the dirty paper coding. n denotes Additive White Gaussian Noise (AWGN) of the receive antenna, A denotes the matrix for the precoding and the dirty paper coding in the transmitting end to acquire the maximum diversity gain per receive antenna, and c denotes an original signal transmitted from the transmitting end.

The signals received on the receive antennas are expressed as Equation (2) using Equation (1).

$$r_1 = b_{11}c_1 + b_{12}c_2 + \ldots + b_{1N}c_N + n_1 \quad (2)$$
$$r_2 = [b_{21}c_1] + b_{22}c_2 + \ldots + b_{2N}c_N + n_2$$
$$\vdots$$
$$r_K = [b_{K1}c_1 + b_{K2}c_2 + \ldots + b_{K(N-1)}c_{N-1}] + b_{KN}c_N + n_K$$

$r_i$ denotes the signal received on the i-th receive antenna, $b_{i,j}$ denotes the matrix for the precoding and the dirty paper coding to acquire the maximum diversity gain of the signal transmitted from the j-th transmit antenna of the transmitting end to the i-th receive antenna of the receiving end, $c_j$ denotes the original signal transmitted from the transmitting end via the j-th transmit antenna, and $n_i$ denotes the AWGN of the i-th receive antenna in the receiving end.

The dirty paper coder 210 can remove [ ] part in Equation (2) using the ZF based dirty paper coding to cancel the interference between the users or between the antennas. The dirty paper coder 210 sends the original signal to the first receive antenna. In doing so, the dirty paper coder 210 can know the signal $r_1$ received on the first receive antenna.

Next, the dirty paper coder 210 cancels interference in the signal to be sent to the second receive antenna through the dirty paper coding using the signal $c_1$ transmitted to the first receive antenna. Specifically, the dirty paper coder 210 codes the signal to be sent to the second receive antenna with the value considering $[b_{21}c_1]$ using $c_1$ detected by decoding $r_1$ so that the second receive antenna can get the $[b_{21}c_1]$-free signal.

As such, the dirty paper coder 210 cancels the interference of $c_2$ using $c_1$ and cancels the interference of $c_N$ using $c_1$ through $c_{N-1}$.

When $c_1$ has error, the error of $c_1$ affects the decoding of not only $c_2$ but also $c_K$ and thus the error is propagated increasingly.

To address this problem, the dirty paper coder 210 arranges the receive antennas by considering the SINR or the sum capacity under the control of the interference cancellation controller 210. Next, the dirty paper coder 210 applies the dirty paper coding on the signal to be transmitted to the receive antenna of the low error probability due to the good channel state among the arranged receive antennas. The dirty paper coder 210 applies the dirty paper coding on the signals to be sent to the arranged receive antennas by taking into account the interference signals of the receive antennas. The dirty paper coder 210 performs the dirty paper coding on the transmit signal by applying the interference signal per receive antenna based on Equation (3).

$$u_j = \frac{\left[\sum_{i=1}^{j-1} b_{ji} c_i\right]}{b_{jj}} \quad (3)$$

In Equation (3), $u_j$ denotes a variable for the dirty paper coding of the signal to be transmitted to the j-th receive antenna, and $$\sum_{i=1}^{j-1} b_{ji} c_i$$

denotes the interference signal of the j-th receive antenna.

The dirty paper coder 210 performs the dirty paper coding on the signal to be transmitted to the j-th receive antenna by taking into account the interference signal per receive antenna based on Equation (3).

In the process of the dirty paper coding, when the effect of the interference signal on the channel of the j-th receive antenna is greater than a reference value, error is highly likely to occur in the dirty paper coding. Thus, the dirty paper coder 210 can selectively perform the dirty paper coding according to the ratio of the interference signal and the transmit signal. As a result, the dirty paper coder 210 can block the signal of the considerable error from affecting the next signal.

Figure 3:
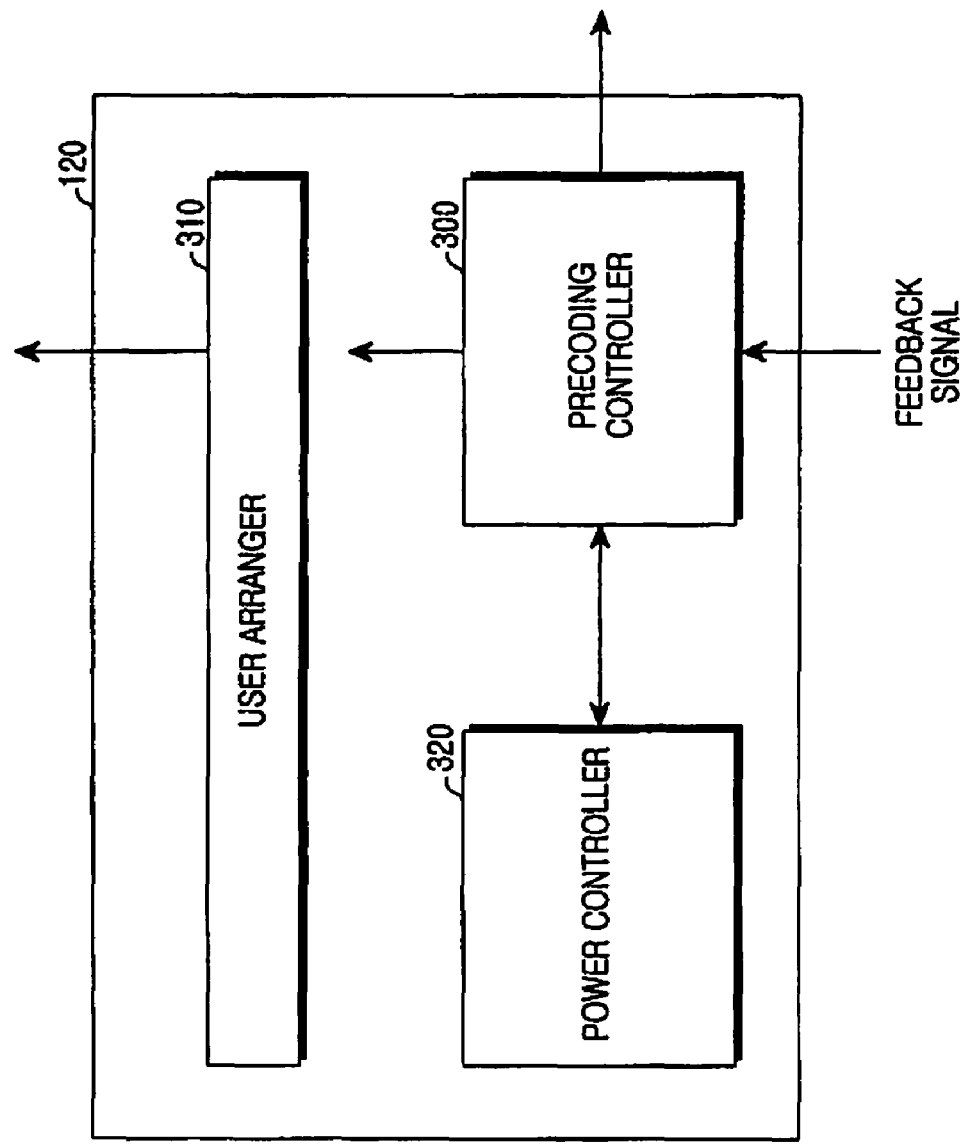
FIG. 3 is a diagram illustrating an interference cancellation controller of the transmitting end in the multi-antenna system according to an embodiment of the present invention.

FIG. 3 is a block diagram illustrating the interference cancellation controller 120 of the transmitting end in the multi-antenna system according to an embodiment of the present invention.

The interference cancellation controller 120 of FIG. 3 includes a precoding controller 300, a user arranger 310, and a power controller 320.

The precoding controller 300 generates the precoding matrix which maximizes the diversity gain per receive antenna according to the channel information received from the receiving ends. For example, the precoding controller 300 generates the precoding matrix including elements expressed as Equation (4).

$$a_{k,j} = \sqrt{P_j} \cdot \frac{h_{j,k}^*}{\sqrt{\sum_{k=1}^{N} |h_{j,k}|^2}} \quad (4)$$

$a_{k,j}$ denotes the element of the precoding matrix which precodes the transmit signal to maximize the diversity gain of the j-th transmit antenna and the k-th receive antenna, and $P_j$ denotes the transmit power for carrying the signal to the j-th receive antenna. $h_{j,k}$ denotes channel information between the j-th receive antenna and the k-th transmit antenna, and N denotes the number of the transmit antennas.

For the transmitting end to maintain the constant transmit power, the elements of the precoding matrix based on Equation (4) should meet the condition of Equation (5).

$$\sum_{i=1}^{2} \sum_{j=1}^{2} |a_{i,j}|^2 = 1 \quad (5)$$

$a_{i,j}$ denotes the element of the precoding matrix which precodes the transmit signal to maximize the diversity gain of the j-th transmit antenna and the i-th receive antenna. $|a_{i,j}|^2$ denotes the transmit power $P_j$ of $a_{i,j}$.

As expressed in Equation (5), the sum of the powers of the elements of the precoding matrix should be 1.

In the precoding matrix including the elements as expressed in Equation (4), the transmit power in each row should be optimized for the Signal to Interference Noise Ration (SINR) per receive antenna or per user, or the sum capacity. To this end, the precoding controller 300 calculates the SINR for each receive antenna, or the sum capacity. Next, the precoding controller 300 controls the transmit power for each receive antenna in the precoding matrix so as to optimize for the SINR per receive antenna or the sum capacity. For example, the SINR of the receive antenna can be computed based on Equation (6).

$$\lambda_K = \frac{|b_{KK} c_K|^2}{\left|\sum_{j=K+1}^{N} b_{Kj} c_j\right|^2 + \frac{1}{SNR_K}} \quad (6)$$

$\lambda_K$ denotes the SINR of the k-th receive antenna, and $SNR_K$ denotes the original Signal to Noise Ratio (SNR) of the k-th receive antenna. $b_{i,K}$ denotes the elements indicative of the product of the precoding matrix, which precodes the signal transmitted via the K-th transmit antenna to maximize the diversity gain of the i-th receive antenna, and the channel matrix. N denotes the number of the transmit antennas.

Using Equation (6), the multi-antenna system of FIG. 1 can calculate the SINRs of the first receive antenna and the second receive antenna based on Equation (7).

$$\lambda_1 = \frac{|h_{11} a_{11} + h_{12} a_{21}|^2}{|h_{11} a_{12} + h_{12} a_{22}|^2 + \frac{1}{SNR_1}} \quad (7)$$

$$\lambda_2 = |h_{21} a_{12} + h_{22} a_{22}|^2 \cdot SNR_2$$

$\lambda_i$ denotes the SINR of the i-th receive antenna, $h_{ij}$ denotes the channel between the i-th receive antenna and the j-th transmit antenna, $a_{ij}$ denotes the element of the precoding matrix which precodes the signal transmitted via the j-th transmit antenna to maximize the diversity gain of the i-th receive antenna, and $SNR_i$ denotes the SNR of the i-th receive antenna.

The preceding controller 300 substitutes a of Equation (7) with Equation (4). Since the SINRs of the first receive antenna and the second receive antenna meet $\lambda_1 = \lambda_2$, it is possible to calculate the transmit power $P_1$ optimized for the SINR of the first receive antenna or the sum capacity based on Equation (8).

$$\sqrt{|h_{11}|^2 + |h_{12}|^2} \cdot P_1 = (1 - K \cdot P_1)^2 \cdot \frac{|h_{11} h_{21}^* + h_{12} h_{22}^*|^2}{\sqrt{|h_{21}|^2 + |h_{22}|^2}} \cdot SNR_2 + \quad (8)$$

$$(1 - K \cdot P_1) \cdot \sqrt{|h_{21}|^2 + |h_{22}|^2} \cdot \frac{SNR_2}{SNR_1}$$

$h_{ij}$ denotes the channel between the i-th receive antenna and the j-th transmit antenna, $P_i$ denotes the transmit power for delivering the signal to the i-th receive antenna, and $SNR_i$ denotes the SNR of the i-th receive antenna.

The precoding controller 300 computes the transmit power for the first receive antenna based on Equation (8). In doing so, the sum of the transmit powers of the first receive antenna and the second receive antenna should be 1 ($P_1+P_2=1$). The precoding controller 300 can acquire the transmit power of the second receive antenna using the transmit power of the first receive antenna.

Next, the precoding controller 300 can update the elements of the precoding matrix according to the transmit powers of the receive antennas determined at the power controller 320. For example, the precoding controller 300 generates the precoding matrix according to the channel information of the receive antennas. The preceding matrix can be modified by applying a weight of the transmit power determined at the power controller 320. Alternatively, the precoding controller 300 may generate the precoding matrix by applying the transmit powers of the receive antennas provided from the power controller 320.

The user arranger 310 arranges the receive antennas to be serviced, according to the SINR or the sum capacity of the receive antennas as provided from the precoding controller 300. When arranging the receive antennas, the user arranger 310 takes account of the SINR or the sum capacity calculated based on Equation (7), or calculated based on both of Equation (6) and Equation (7).

Next, the user arranger 310 controls the dirty paper coder 210 to arrange the rows of the matrix output from the precoder 200 using the information of the arranged receive antennas.

The power controller 320 controls the transmit powers of the receive antennas to optimize the transmit powers in the power loss and the shaping loss according to the dirty paper coding using the SINR or the sum capacity of the receive antennas provided from the precoding controller 300. In the dirty paper coding, the transmitting end utilizes more power of M/(M−1) as coding the symbols of the transmit signal in consideration of the interference. In the dirty paper coding, the transmitting end is subject to the shaping loss. Thus, the power controller 320 controls the transmit powers to optimize the transmit powers of the receive antennas by considering the power loss and the shaping loss in the dirty paper coding. Herein, M denotes a modulation order.

For example, the power controller 320 controls the transmit powers of the receive antennas such that a difference of the SINRs of the receive antennas based on the power loss and the shaping loss should meet Equation (9).

$$|SINR_{1,k} - SINR_{2,k}| < \epsilon \quad (9)$$

$SINR_{i,k}$ denotes the SINR between the i-th transmit antenna and the k-th receive antenna by taking into account the power loss and the shaping loss, and $\epsilon$ denotes a reference value.

When the SINR of the receive antennas calculated based on the power loss and the shaping loss meets Equation (9), the power controller 320 maintains the transmit powers of the receive antennas as calculated in the preceding controller 300. By contrast, when the SINR of the receive antennas calculated based on the power loss and the shaping loss does not meet Equation (9), the power controller 320 decreases the transmit powers of the receive antennas calculated at the precoding controller 300 by a certain rate. Alternatively, the power controller 320 may control the transmit powers of the receive antennas as in Equation (9) using the difference of the sum capacities of the receive antennas calculated based on the power loss and the shaping loss.

When controlling the transmit power, the power controller 320 provides the modified transmit powers of the receive antennas to the precoding controller 300 so as to update the precoding matrix.

Figure 4:
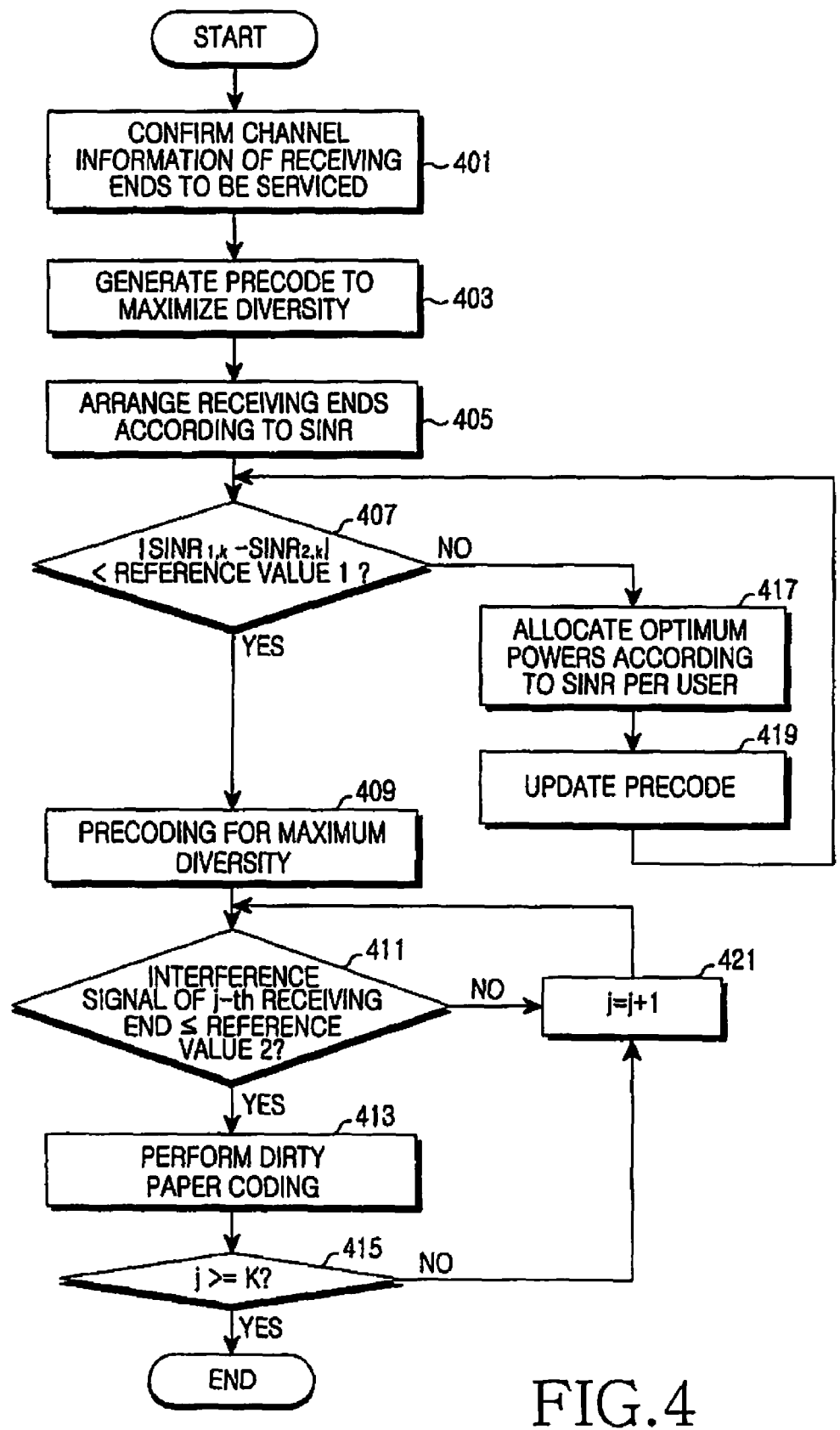
FIG. 4 is a diagram illustrating an interference canceling method in the multi-antenna system according to an embodiment of the present invention.

FIG. 4 is a flow diagram illustrating the interference canceling method in the multi-antenna system according to an embodiment of the present invention.

In step 401, the transmitting end confirms the channel information of the receive antennas of the receiving ends to be serviced. For instance, the transmitting end confirms the channel information of the receive antennas of the receiving ends from the feedback information provided from the receiving ends. Next, the transmitting end selects the receiving ends to be serviced among the receiving ends through the scheduling.

In step 403, the transmitting end generates the precoding matrix which maximizes the diversity gain of the receive antennas, using the channel information of the receive antennas. For example, the transmitting end generates the precoding matrix including the elements based on Equation (4). The precoding matrix is generated using the transmit powers which are optimized for the SINR of the receive antennas or the sum capacity.

In step 405, the transmitting end arranges the receive antennas according to the SINR or the sum capacity. The transmitting end also arranges the rows of the precoding matrix similar to the arranged receive antennas.

In step 407, the transmitting end checks whether the transmit powers of the receive antennas are optimized for the SINR or the sum capacity of the receive antennas by taking into account the shaping loss and the power loss of the dirty paper coding. That is, the transmitting end calculates the SINR or the sum capacity by considering the shaping loss and the power loss of the receive antennas. Next, the transmitting end compares the difference of the SINRs or the sum capacities of the receive antennas with the reference value '1'.

When the difference of the SINRs or the sum capacities of the receive antennas is greater than or equal to the reference value '1' ($|SINR_{1,k}-SINR_{2,k}|\geq$reference value 1 or $|C_{1,k}-C_{2,k}|\geq$reference value 1), the transmitting end allocates the transmit power which optimizes the SINR or the sum capacity of the receive antennas in step 417. In other words, the transmitting end adjusts the transmit powers for the receive antennas to generate the precoding matrix, to the transmit powers based on the shaping loss and the power loss.

In step 419, the transmitting end updates the precoding matrix generated in step 403 according to the adjusted transmit powers of the receive antennas. For example, the transmitting end updates the precoding matrix generated in step 403 by applying a weight based on the adjusted transmit powers to the precoding matrix. Alternatively, the transmitting end may generate a new precoding matrix by applying the adjusted transmit powers to Equation (4).

Next, the transmitting end returns to step 407 and checks whether the transmit powers of the receive antennas are optimized for the SINR or the sum capacity in consideration of the shaping loss and the power loss.

By contrast, when the difference of the SINRs or the sum capacities of the receive antennas is less than the reference value '1' ($|SINR_{1,k}-SINR_{2,k}|<$reference value 1 or $|C_{1,k}-C_{2,k}|<$reference value 1) in step 407, the transmitting end precodes the transmit signals using the generated precoding matrix in step 409.

In step 411, the transmitting end confirms the ratio of the transmit signal and the interference signal to determine whether to perform the dirty paper coding on the signal to be sent to the j-th receive antenna. The transmitting end determines whether to conduct the dirty paper coding based on the arranged order of step 405.

When the ratio of the interference signal is greater than a reference value '2', the transmitting end sets zero without the dirty paper coding on the signal to be sent to the j-th receive antenna in step 421. That is, when conducting the dirty paper coding on the precoded signal, the transmitting end controls not to perform the dirty paper coding on a signal of high error probability in the coding operation because of its considerable influence of the interference.

Next, the transmitting end increases the receive antenna index j by one, which is used to determine whether to conduct the dirty paper coding in the next channel. The transmitting end returns to step 411 and determines whether to apply the dirty paper coding on the signal to be sent to the increased j-th receive antenna.

By contrast, when the ratio of the interference signal is less than or equal to the reference value '2', the transmitting end performs the dirty paper coding on the signal to be sent to the j-th receive antenna in step 413.

In step 415, the transmitting end checks whether every transmit signal under goes through the dirty paper coding.

When all of the transmit signals do not pass through the dirty paper coding (j<K), the transmitting end increases the receive antenna index j by one to determine whether to perform the dirty paper coding of the next channel in step 421.

Next, the transmitting end determines whether to conduct the dirty paper coding on the signal to be sent to the increased j-th receive antenna in step 411.

In contrast, when all of the transmit signals pass through the dirty paper coding (j≧K), the transmitting end finishes this process.

Figure 5:
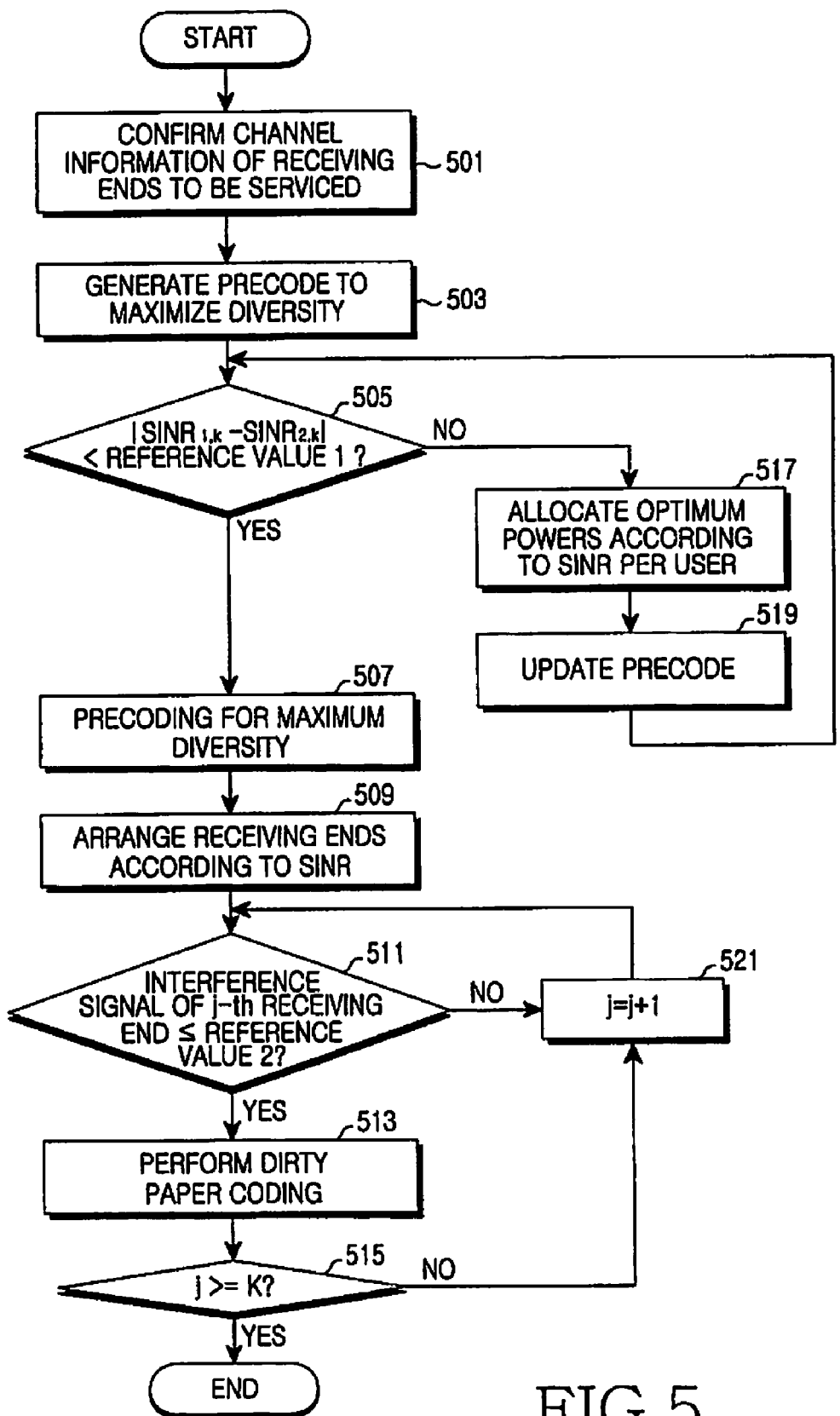
FIG. 5 is a diagram illustrating an interference canceling method in a multi-antenna system according to another embodiment of the present invention.

FIG. 5 is a flow diagram illustrating an interference canceling method in a multi-antenna system according to another embodiment of the present invention.

In step 501, the transmitting end confirms the channel information of the receive antennas of the receiving ends for the service. For example, the transmitting end confirms the channel information of the receive antennas of the receiving ends from the feedback information provided from the receiving ends within the service coverage. Next, the transmitting end selects the receiving ends to be serviced among the receiving ends through the scheduling.

In step 503, the transmitting end generates the precoding matrix which maximizes the diversity gain of the receive antennas, using the channel information of the receive antennas. For example, the transmitting end generates the precoding matrix including the elements based on Equation (4). The precoding matrix is generated using the transmit powers which are optimized for the SINR or the sum capacity of the receive antennas.

In step 505, the transmitting end checks whether the transmit powers of the receive antennas are optimized for the SINR or the sum capacity of the receive antennas by taking into account the shaping loss and the power loss of the dirty paper coding. In further detail, the transmitting end calculates the SINR or the sum capacity by considering the shaping loss and the power loss of the receive antennas. Next, the transmitting end compares the difference of the SINRs or the sum capacities of the receive antennas with the reference value '1'.

When the difference of the SINRs or the sum capacities of the receive antennas is greater than or equal to the reference value '1' ($|SINR_{1,k}-SINR_{2,k}|\geq$reference value 1 or $|C_{1,k}-C_{2,k}|\geq$reference value 1), the transmitting end allocates the transmit power which optimizes the SINR or the sum capacity of the receive antennas in step 517. In other words, the transmitting end adjusts the transmit powers for the receive antennas to generate the precoding matrix, to the transmit powers based on the shaping loss and the power loss.

In step 519, the transmitting end updates the precoding matrix generated in step 503 according to the adjusted transmit powers of the receive antennas. For example, the transmitting end updates the precoding matrix generated in step 503 by applying a weight based on the adjusted transmit powers to the precoding matrix. Alternatively, the transmitting end may generate a new precoding matrix by applying the adjusted transmit powers to Equation (4).

Next, the transmitting end goes back to step 505 and checks whether the transmit powers of the receive antennas are optimized for the SINR or the sum capacity in consideration of the shaping loss and the power loss.

By contrast, when the difference of the SINRs or the sum capacities of the receive antennas is less than the reference value '1' ($|SINR_{1,k}-SINR_{2,k}|<$reference value 1 or $|I_{1,k}-C_{2,k}|<$reference value 1) in step 505, the transmitting end precodes the transmit signals using the generated precoding matrix in step 507.

In step 509, the transmitting end arranges the precoded signal according to the SINR or the sum capacity of the receive antennas. The transmitting end arranges the rows of the precoded signal matrix in the descending order of the SINR or the sum capacity. At this time, the order of the receive antennas to be serviced by the transmitting end is also arranged based on the magnitude of the SINR or the sum capacity.

In step 511, the transmitting end confirms the ratio of the transmit signal and the interference signal to determine whether to perform the dirty paper coding on the signal to be sent to the j-th receive antenna. The transmitting end determines whether to conduct the dirty paper coding based on the arranged order of step 509.

When the ratio of the interference signal is greater than a reference value '2', the transmitting end sets to zero without the dirty paper coding on the signal to be sent to the j-th receive antenna in step 521. That is, when conducting the dirty paper coding on the precoded signals, the transmitting end determines not to perform the dirty paper coding on a signal of high error probability in the coding operation because of the considerable influence of the interference.

Next, the transmitting end increases the receive antenna index j by one, which is used to determine whether to conduct the dirty paper coding in the next channel. The transmitting end returns to step 511 and determines whether to apply the dirty paper coding on the signal to be sent to the increased j-th receive antenna.

By contrast, when the ratio of the interference signal is less than or equal to the reference value '2', the transmitting end performs the dirty paper coding on the signal to be sent to the j-th receive antenna in step 513.

In step 515, the transmitting end checks whether every transmit signal goes through the dirty paper coding.

When all of the transmit signals do not pass through the dirty paper coding (j<K), the transmitting end increases the receive antenna index j by one to determine whether to perform the dirty paper coding of the next channel in step 521.

Next, the transmitting end determines whether to conduct the dirty paper coding on the signal to be sent to the increased j-th receive antenna in step 511. In contrast, when all of the transmit signals pass through the dirty paper coding (j≧K), the transmitting end finishes this process.

The following explanations describe the performance change in the arrangement for controlling the transmit powers to meet the QoS per receive antenna and for lowering the error propagation in the dirty paper coding when the interference is cancelled on the user basis or on the receive antenna basis in the multi-antenna system.

Figure 6A:
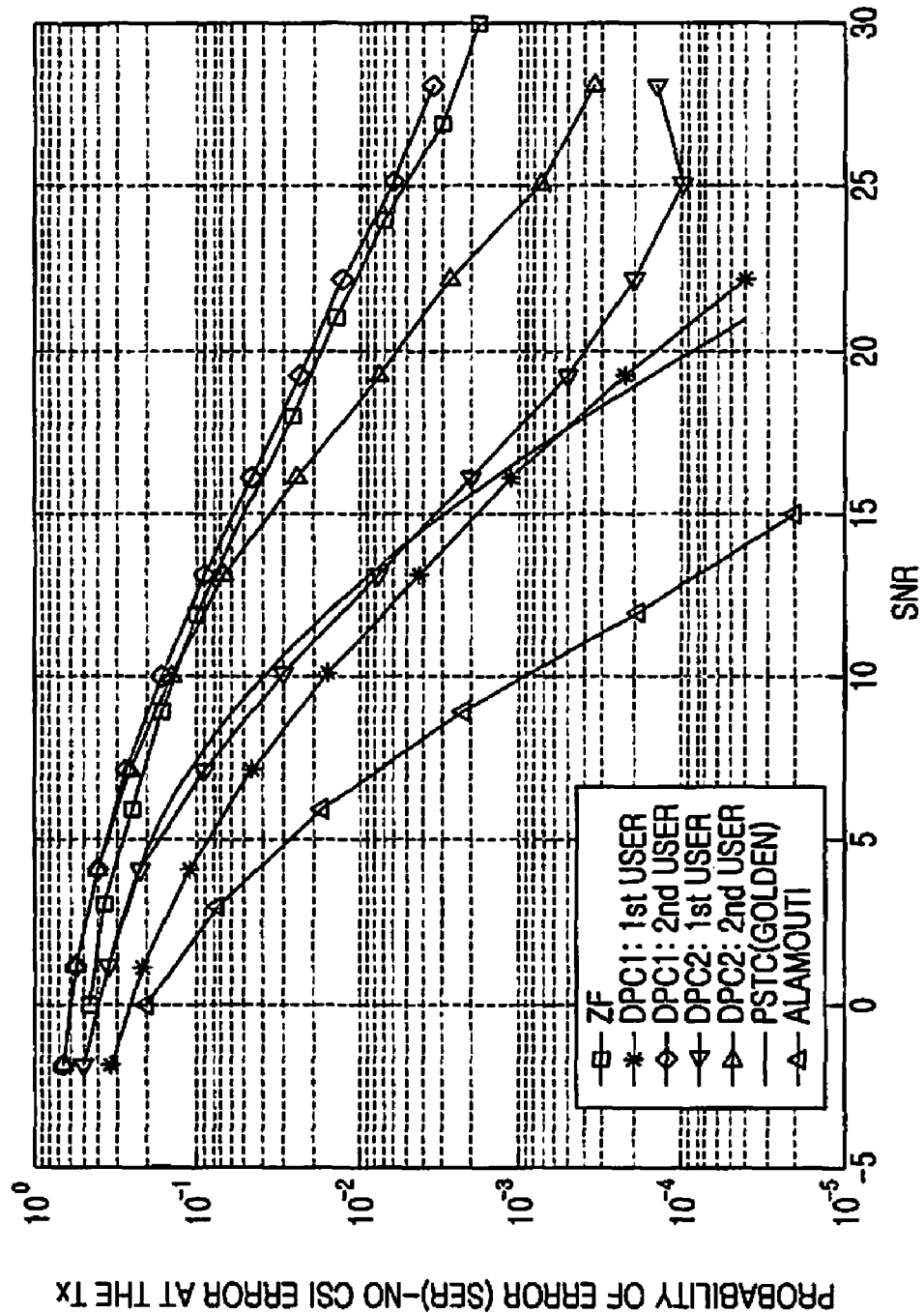
FIGS. 6A and 6B are diagrams illustrating a performance change in the interference cancellation in the multi-antenna system according to an embodiment of the present invention.
Figure 6B:
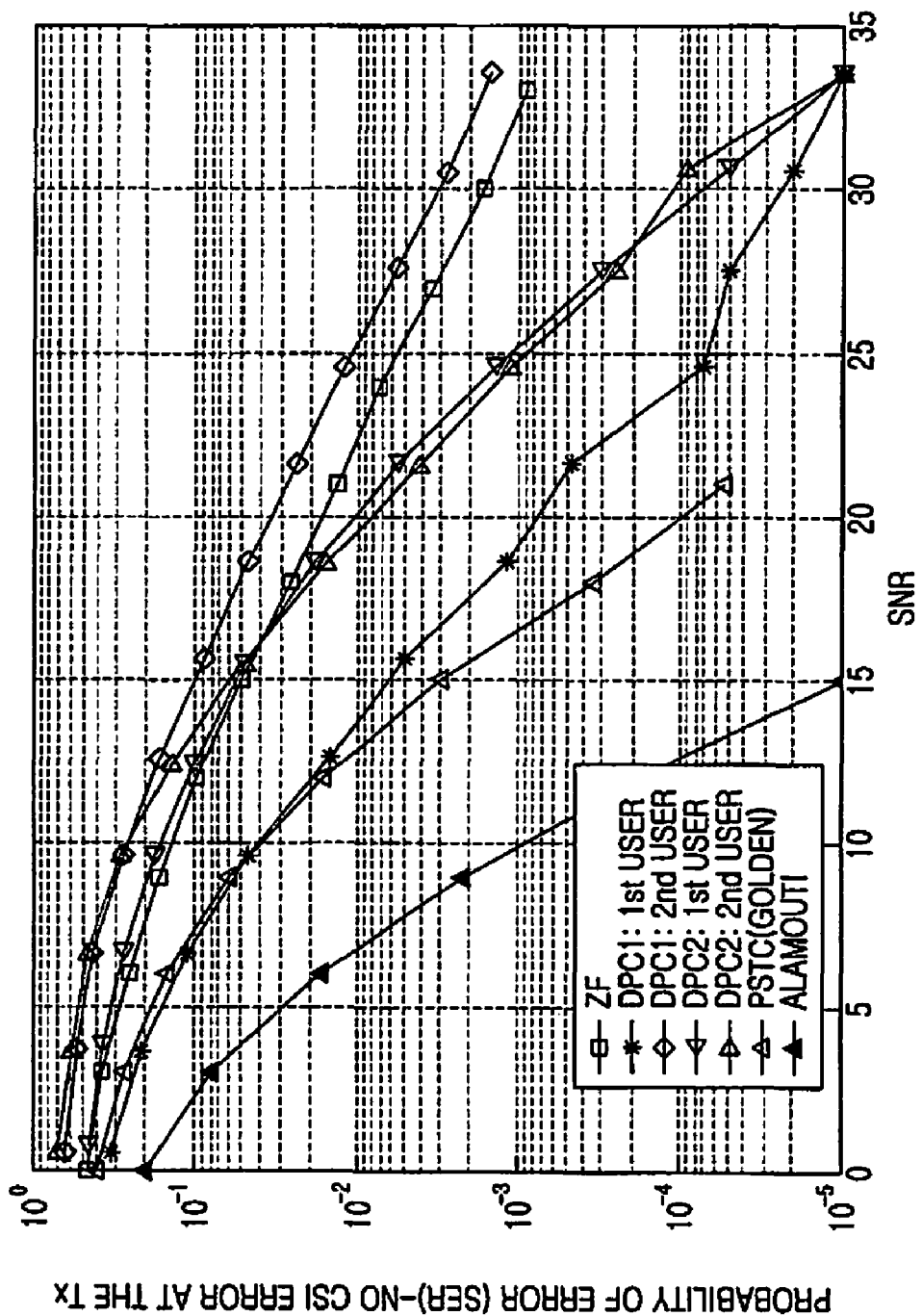

FIGS. 6A and 6B are graphs showing the performance change in the interference cancellation in the multi-antenna system according to an embodiment of the present invention. The horizontal axis indicates the SNR and the vertical axis indicates the probability of error.

Particularly, FIG. 6A shows the probability of error when the dirty paper coding is carried out without controlling the transmit powers, and FIG. 6B shows the probability of error when the dirty paper coding is carried out with the transmit power controlled according to the present invention.

In FIG. 6A, there is a great difference between the error probabilities of the first user and the second user of the Dirty Paper Coding (DPC)2 based on the SNR, because of the power loss and the shaping loss in the dirty paper coding.

By contrast, when the dirty paper coding is performed after controlling the powers in consideration of the power loss and the shaping loss in the dirty paper coding, the error probability based on the SNR of the first user and the second user of the DPC2 are substantially the same.

In this embodiment of the present invention, the transmitting end of the multi-antenna system precodes the transmit signals using the preceding matrix with the transmit powers controlled to meet the QoS per user. Next, the transmitting end conducts the dirty paper coding by arranging the precoded transmit signals according to the SINR or the sum capacity of the receiving ends.

Alternatively, the transmitting end of the multi-antenna system may perform the dirty paper coding by arranging the un-precoded transmit signals according to the SINR or the sum capacity of the receiving end.

As set forth above, the multi-antenna system controls the transmit powers to meet the QoS per user and cancels the interference using the non-linear scheme by arranging the transmit signals according to the SINR per user. Therefore, the error propagation in the dirty paper coding can be reduced, and the power loss and the shaping loss in the dirty paper coding can be lowered. Consequently, it is possible to make the SINR of the serviced users constant.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method for canceling interference in a transmitting apparatus of a multi-antenna system, the method comprising the steps of:

generating a precode which maximizes a diversity gain of one or more receive antennas using channel information of the one or more receive antennas to be serviced;

updating transmit powers of the one or more receive antennas in accordance with a power loss and a shaping loss according to a nonlinear precoding scheme;

updating the precode using the updated transmit power;

precoding transmit signals using the updated precode; and performing the nonlinear precoding scheme on the precoded transmit signals to be transmitted to the one or more receive antennas, wherein the generating the precode comprises:

calculating at least one of a Signal to Interference and Noise Ratio (SINR) and a sum capacity of the one or more receive antennas;

calculating the transmit powers of the one or more receive antennas using at least one of the SINR and the sum capacity;

generating the precode which maximizes the diversity gain of the one or more receive antennas using the transmit powers; and arranging rows of the generated precode according to at least one of the SINR and the sum capacity of the one or more receive antennas, wherein the arranged precode is updated according to the updated transmit powers.

2. The method of claim 1, wherein the precode comprises elements expressed as the following equation:

$$a_{k,j} = \sqrt{P_j} \cdot \frac{h_{j,k}^*}{\sqrt{\sum_{k=1}^{N} |h_{j,k}|^2}}$$

where $a_{k,j}$ denotes an element of a precoding matrix which precodes the transmit signal to maximize the diversity gain of a j-th transmit antenna and a k-th receive antenna, $P_j$ denotes a transmit power for a j-th receive antenna, $h_{j,k}$ denotes channel information between a j-th receive antenna and a k-th transmit antenna, and N denotes a number of transmit antennas.

3. The method of claim 1, wherein the updating transmit powers comprises:

calculating at least one of the SINR and the sum capacity of the one or more receive antennas in accordance with the power loss and the shaping loss according to the nonlinear precoding scheme; and updating the transmit powers of the one or more receive antennas, when a difference of at least one of the SINRs and the sum capacities of the one or more receive antennas is greater than a reference value, wherein the transmit powers are used to generate the precode.

4. The method of claim 3, wherein the updating transmit powers further comprises:

maintaining the transmit powers used to generate the precode with respect to the one or more receive antennas, when the difference of the SINRs or the sum capacities of the one or more receive antennas is less than the reference value.

5. The method of claim 1, wherein the updating the precode comprises:

updating the precode using a weight generated by applying the updated transmit powers of the one or more receive antennas.

6. The method of claim 1, wherein the updating the precode comprises:

re-generating the precode to maximize the diversity gain of the one or more receive antennas by applying the updated transmit powers of the one or more receive antennas.

7. The method of claim 1, wherein the performing the nonlinear precoding scheme comprises:

arranging rows of a precoded transmit signal matrix according to at least one of the SINR and the sum capacity of the one or more receive antennas; and performing the nonlinear precoding scheme on the arranged transmit signal.

8. The method of claim 1, further comprising, after precoding the transmit signal:

determining whether to perform the nonlinear precoding scheme in accordance with a ratio of the transmit signal and an interference signal, wherein the precoded transmit signal is applied to the nonlinear precoding scheme when the ratio of the transmit signal and the interference signal is less than a reference value.

9. A transmitting apparatus in a multi-antenna system, comprising:

a controller for controlling transmit powers of one or more receive antennas using channel information of the one or more receive antennas to be serviced, and generating a precode which maximizes a diversity gain of the one or more receive antennas using the transmit powers; and a transmitter for precoding transmit signals using the precode, performing a nonlinear precoding scheme on the precoded transmit signals, and transmitting the transmit signals via transmit antennas, wherein the controller comprises:

a precoding controller for generating the precode using transmit powers calculated using at least one of a Signal to interference and Noise Ratio (SINR) and a sum capacity of the one or more receive antennas, and updating the precode according to updated transmit powers of the one or more receive antennas provided from a power controller; and the power controller for updating the transmit powers of the one or more receive antennas in accordance with a power loss and a shaping loss according to the nonlinear precoding scheme; and an arranger for controlling arrangement of rows of a transmit signal matrix or rows of a precoding matrix in accordance with the channel information of the one or more receive antennas.

10. The transmitting apparatus of claim 9, wherein the precoding controller updates the precode or generates a new precode in accordance with the transmit powers of the one or more receive antennas updated at the power controller.

11. The transmitting apparatus of claim 9, wherein the precoding controller generates the precode, which comprises elements expressed as the following equation:

$$a_{k,j} = \sqrt{P_j} \cdot \frac{h_{j,k}^*}{\sqrt{\sum_{k=1}^{N} |h_{j,k}|^2}}$$

where $a_{k,j}$ denotes an element of a precoding matrix which precodes the transmit signal to maximize the diversity gain of a j-th transmit antenna and a k-th receive antenna, $P_j$ denotes a transmit power for a j-th receive antenna, $h_{j,k}$ denotes channel information between a j-th receive antenna and a k-th transmit antenna, and N denotes a number of transmit antennas.

12. The transmitting apparatus of claim 9, wherein, the power controller updates the transmit powers of the one or more receive antennas, when a difference of at least one of the SINRs and the sum capacities of the one or more receive antennas, which are calculated in accordance with the power loss and the shaping loss according to the nonlinear precoding scheme, is greater than a reference value, wherein the transmit powers are used to generate the precode in accordance with at least one of the calculated SINR and the calculated sum capacity of the one or more receive antennas.

13. The transmitting apparatus of claim 9, wherein the power controller maintains the transmit powers used to generate the precode with respect to the one or more receive antennas, when a difference of at least one of the SINRs and the sum capacities of the one or more receive antennas, which are calculated in accordance with the power loss and the shaping loss according to the nonlinear precoding scheme, is less than a reference value.

14. The transmitting apparatus of claim 9, wherein the transmitter comprises:
- a precoder for precoding the transmit signals using the precode provided from the controller; and
- a dirty paper coder for arranging the precoded transmit signals under control of the controller, performing the nonlinear precoding scheme, and transmitting the precoded transmit signals via transmit antennas.

15. The transmitting apparatus of claim 9, wherein the transmitter comprises:
- a precoder for arranging the transmit signals under control of the controller and precoding the transmit signals using the precode provided from the controller; and
- a dirty paper coder for performing the nonlinear precoding scheme on the precoded transmit signals and transmitting the precoded transmit signals via transmit antennas.

16. The transmitting apparatus of claim 9, wherein the controller, after the transmit signals are precoded, determines whether to perform the nonlinear precoding scheme in accordance with a ratio of the transmit signal and an interference signal, and conducts the nonlinear precoding scheme when the ratio of the transmit signal and the interference signal is less than a reference value.

* * * * *